United States Patent

[11] 3,614,538

[72] Inventor Anne D. Nickola
 Diane Trailer Park, G-6255 North Saginaw Road, Mt. Morris, Mich. 48458
[21] Appl. No. 14,578
[22] Filed Feb. 26, 1970
[45] Patented Oct. 19, 1971
 Continuation-in-part of application Ser. No. 684,199, Nov. 20, 1967, now Patent No. 3,502,785.

[54] MOUNTING PEDESTAL FOR UTILITIES
 22 Claims, 9 Drawing Figs.
[52] U.S. Cl. ................................................ 317/99, 174/38, 174/45 R
[51] Int. Cl. .............................................. H02g 9/00
[50] Field of Search ................................. 174/38, 44, 45, 70; 317/99, 120, 104

[56] References Cited
 UNITED STATES PATENTS
| 1,481,280 | 1/1924 | Bivens | 174/38 UX |
| 2,982,593 | 5/1961 | Chambers | 312/223 |
| D. 204,269 | 4/1966 | Naudus | 174/38 UX |
| 438,773 | 10/1890 | Dinn | 174/45 |
| 1,972,187 | 9/1934 | Farnam | 174/38 UX |
| 3,167,609 | 1/1965 | Brann | 174/45 X |
| 3,502,785 | 3/1970 | Nickola | 174/38 |

FOREIGN PATENTS
| 1,169,544 | 5/1964 | Germany | 174/38 |

Primary Examiner—Laramie E. Askin
Attorney—Hauke, Gifford and Patalidis

ABSTRACT: An improved mounting pedestal adapted to support an electrical power box, an electric meter, a telephone box, a television jack, and a gasmeter operatively in a compact arrangement for providing utility services to a mobile home. A hollow, rectangular metal post is supported in an upright position in the ground, extending thereabove, and supports a mounting bracket on the top thereof. A conventional electric meter and electrical power outlet box are supported by the bracket. An elongated U-shaped channel member is secured to one side of the post and has its lower end opening beneath the surface of the ground. A conventional telephone box and television jack are mounted on the channel member. A conventional gasmeter is mounted on the opposite side of the post from the channel member.

PATENTED OCT 19 1971 3,614,538
SHEET 1 OF 2
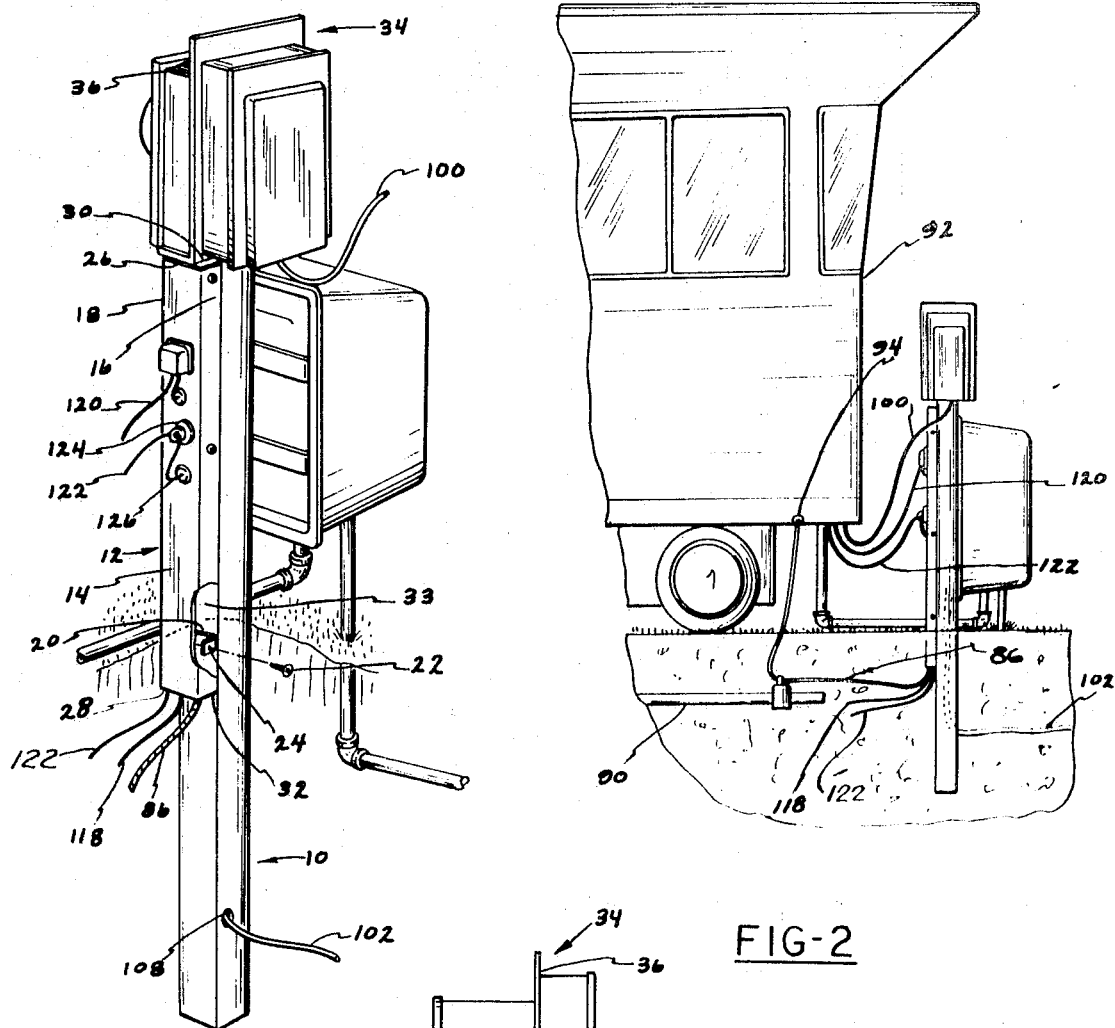
FIG-2
FIG-1
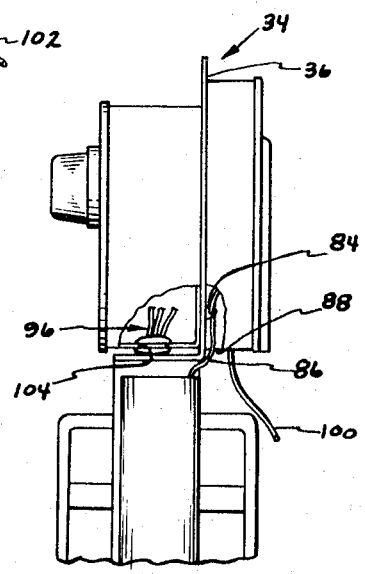
FIG-3
INVENTOR
ANNE D. NICKOLA
BY
Hauke Gifford & Patalidis
Attorneys

PATENTED OCT 19 1971 3,614,538

INVENTOR
ANNE D. NICKOLA
BY
*Nauk Gifford & Patalidis*
Attorneys

MOUNTING PEDESTAL FOR UTILITIES

CROSS-REFERENCE TO RELATED APPLICATION

This present application is a continuation-in-part of application Ser. No. 684,199, filed Nov. 20, 1967 and now U.S. Pat. No. 3,502,785.

BACKGROUND OF THE INVENTION

1. Field of the Invention

The present invention relates to mounting pedestals for utilities, and more particularly to a mounting pedestal adapted for mounting in a safe, compact, unique and novel relationship an electrical power box, an electric meter, a telephone box, a television jack, and a gasmeter for conveniently furnishing such utilities to a mobile home or the like.

2. Description of the Prior Art

Heretofore, electrical power, telephone service, and gas have been provided for mobile homes through separate lines and conduits leading from meters and junction boxes supported in the vicinity of the mobile home but at separate locations selected by each utility company. In trailer parks, if there were no conveniently located tree or utility pole in proximity to the mobile home, it was necessary for each utility company to drive a post into the ground to support the meter or junction box for servicing one or more nearby mobile homes. This resulted in a tangled web of electrical wires, telephone wires, and gaslines. Further, when a mobile home is removed from its parking site, each of the utilities must be disconnected and, if the meters or junction boxes were mounted upon the mobile home itself, they had to be physically removed therefrom at considerable cost of labor.

Each utility company hesitated to mount its equipment upon a post or pole provided by another utility company. If a single mounting pedestal were provided by the owner of the trailer court, it was necessary to secure clearance from the telephone company, the gas company, and the electrical power company, from the state trailer park licensing authority, and from the appropriate licensing authority of the municipality or township within which the trailer park was located before two or more utilities could install their equipment in such close proximity to each other, for reasons of safety.

SUMMARY OF THE INVENTION

The present invention solves the problems of the prior art devices by providing an improved mounting pedestal for utilities adapted to operatively support in a safe, convenient relationship, electrical power, telephone, television, and gas service equipment for a mobile home in a manner which permits convenient connection and disconnection of such services to the mobile home. A hollow, rectangular metal post is supported in an upright position in the ground, extending thereabove, and supports an L-shaped mounting bracket on the top thereof. A conventional electric meter is supported upon the inner side of the bracket, atop the post, and a conventional electrical power outlet box is supported upon the opposing side of the bracket. An aperture in the upstanding portion of the bracket permits interconnection of the meter and power outlet. An elongated U-shaped channel member, open at each end, is secured to one side of the post, forming a passageway therebetween, and has its lower end disposed beneath the surface of the ground. The conventional electrical ground wire for the electrical power assembly extends downwardly through the top opening of the channel member, through the passageway and out the lower opening of the channel member into the ground, where it is in turn connected to a buried metal water pipe providing water to the mobile home and to the conventional electrical ground attachment of the trailer.

A conventional telephone box is mounted on the channel member in a convenient position to provide telephone service to the mobile home. The telephone line leading to the telephone box enters the channel member through its underground opening, extends upwardly within the member, passes outwardly through an aperture immediately below the telephone box, and is operatively connected in the conventional manner within the box.

A conventional gasmeter, mounted on the side of the post opposite the channel member, receives gas through an underground gasline which extends upwardly adjacent the post and enters the meter from below and conveys gas to the house trailer by a gas pipe connected to the conventional gas inlet of the mobile home.

DESCRIPTION OF THE DRAWINGS

A better understanding of the present invention will be achieved from reference to the following description of a preferred embodiment thereof. The description refers to the accompanying drawings wherein like reference characters refer to like parts throughout the several views and in which:

FIG. 1 is a perspective view of my improved mounting pedestal for utilities, showing the electrical power box, electrical meter, telephone box, gasmeter, television cable connection, and electrical ground wire supported thereby;

FIG. 2 is a front view of a portion of a mobile home and surrounding ground area, showing the general manner in which utility equipment and connections are supported and provided by my invention;

FIG. 3 is a left side elevation view, partially in section, of the top portion of my invention;

DESCRIPTION OF THE PREFERRED EMBODIMENT

Figure 4:
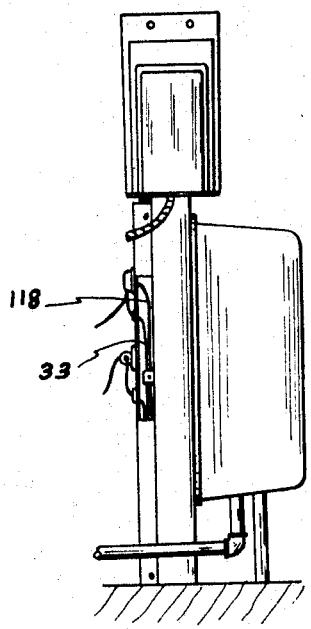
FIG. 4 is a front elevation view of my invention.

Referring to FIG. 1, an elongated, hollow, metal post, generally indicated at 10, preferably has a cross section 3 inches by 3 inches, and is painted with a rustproof paint, or otherwise protected against rusting. Post 10 is of sufficient length to be supported upright when buried or driven into the ground, and to extend upwardly above the ground a sufficient distance to conveniently support utility meters and junction boxes thereon, as more particularly hereinafter described. Preferably, the post 10 is 8 feet, more or less, in length, and extends approximately 4 feet 6 inches into the ground, and approximately 42 inches above the surface of the ground.

Referring to FIGS. 1 and 2, an elongated U-shaped channel member, generally indicated at 12, is secured to the post 10 along one side thereof. Preferably, the channel member is 4 feet, more or less, in length, and extends downwardly from a point adjacent the top of the post 10 with its lower end disposed in the ground.

The channel member 12 includes an elongated central portion 14, preferably formed 3 inches wide so as to correspond to the width of the side of the post 10, and a pair of elongated side portions 16 and 18 extending outwardly from the longitudinal edges of the central portion 14 in substantially parallel planes. The side portions 16 and 18 preferably have a width of 1½ to 2 inches. The channel member 12 is secured to the post 10 by means of a plurality of U-shaped brackets 20 that are secured to the side of the post 10 by any convenient means. Machine screws 22 extend through the side portions 16 and 18 and into apertures 24 formed in the brackets 20 securing the member 12 thereto. The top and bottom edges 26 and 28 of the member 12 define a top and bottom opening 30 and 32, respectively, into a passageway 33 formed between the channel member 12 and the post 10.

Figure 7:
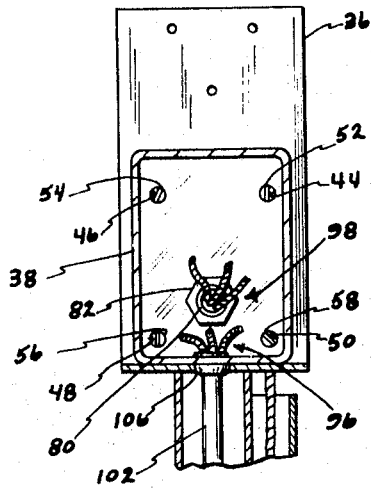
FIG. 7 is a sectional view of an electrical meter taken along line 7—7 of FIG. 5.
Figure 8:
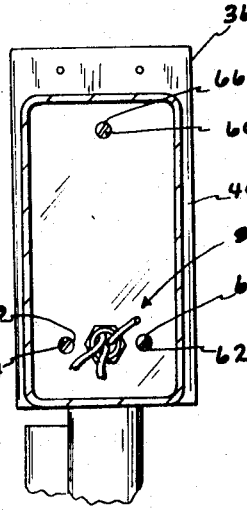
FIG. 8 is a sectional view of an electrical power outlet taken along line 8—8 of FIG. 6.
Figure 9:
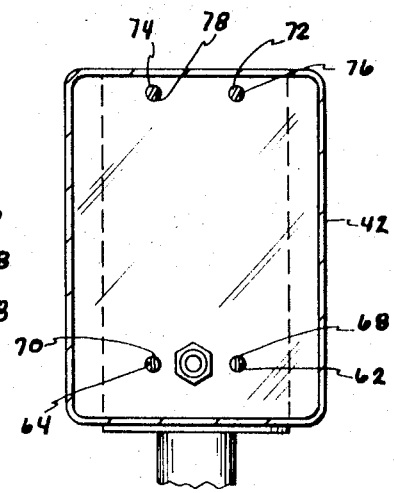
FIG. 9 is a view similar to FIG. 8 but showing a 100-ampere electrical power outlet in use with my invention in place of a 50-ampere outlet.

Preferably, an L-shaped mounting bracket 34 has its base portion 35 welded or otherwise secured atop post 10, as best shown in FIGS. 1, 3, 5 and 6. As best shown in FIGS. 7, 8 and 9, the upright portion 36 of bracket 34 is drilled with nine holes, each adapted to receive a machine screw and positioned to correspond with the standard mounting screwbolt apertures provided in the rear surface of a conventional electric power meter 38 and a conventional electrical power box, preferably, a 50-ampere box 40 or a 100-ampere box 42, although it is clear that other ampere boxes can be used. In Michigan, the conventional electrical meter utilized by the electric utility companies requires use of four apertures 44, 46, 48 and 50 to receive machine screws 52, 54, 56 and 58. The conventional 50-ampere electrical box 40 available for use in this same area requires three apertures 60, 62 and 64 to receive machine screws 66, 68 and 70, respectively, extending through corresponding apertures in the box. A pair of additional apertures 72, 74 are also provided in bracket 34 to receive the upper pair of machine screws 76, 78 of a conventional 100-ampere electrical power box 42 when such a larger box is used instead of a 50-ampere electrical power box 40.

A larger aperture 80 is also drilled in the upright portion 36 of bracket 34 in a position of mutual alignment with the conventional knockout apertures (not shown) conventionally provided at the rear of meter 38 and power box 40 or 42. When the meter and either power box are supported upon bracket 34, as hereinabove described, and with the knockout apertures of the meter and box removed, a conventional threaded raceway 82 is secured in the usual manner through the knockout apertures and aperture 80 of bracket 34 thus providing a passage for electrical wires between meter 38 and power box 40 or 42, and further securing the meter and power box together and to bracket 34.

It will be noted that although the bracket 34 is shown as having an L-shaped construction, the bracket 34 may take any convenient shape, for example, an inverted T-shape construction, that will secure the power meter 38 and the power box 40 or 42 to the top of the post 10. Although the meter 38 and the box 40 or 42 are shown mounted in a back-to-back relationship, it will be noted that the meter box may be secured in any relative position to the upper portion of the post 10.

Referring to FIGS. 1, 2, 3 and 4, the conventional ground terminal 84 provided in power box 40 or 42 is grounded by a ground wire 86 which extends downwardly through an aperture 88 in the bottom of the box 40 or 42, and preferably through opening 30 into the channel member 12, emerging through opening 32 which lies underground when the post is in use. It is apparent that the ground wire could, however, extend along the outside of the post if this is preferred. As best shown in FIG. 2, ground wire 86 is connected, in turn, to one of the conventional underground metal water pipes 90 provided for the mobile home 92 to which the utility services are provided, and to the conventional ground wire connection 94 of the mobile home itself. This combination insures a positive grounding of the mobile home appliances, the post, the power box, power meter, telephone box, television jack and the gasmeter mounted thereon.

Referring to FIGS. 3 and 7, electrical power is supplied to the meter 38 through three conventional electrical wires generally indicated at 96. After metering, the electric current passes by electrical wires generally indicated at 98 through raceway 82 into power box 40 or 42. A flexible, weatherproof electrical cord 100, as shown in FIGS. 1 and 2, then conducts the electrical current from power box 40 or 42 to the conventional electrical power inlet (not shown) of mobile home 92. Electrical wires 96 are preferably shielded by an electrical conduit 102 extending from the bottom of the meter 38 through an aperture 104 formed therein and an aperture 106 formed in the base portion 35 of the bracket 34 and into the middle of the post 10. The conduit 102 extends downwardly through the post 10 to a point below the ground and out aperture 108 formed in the post to a transformer or other conventional electrical power distribution point maintained by the electrical power company.

Figure 6:
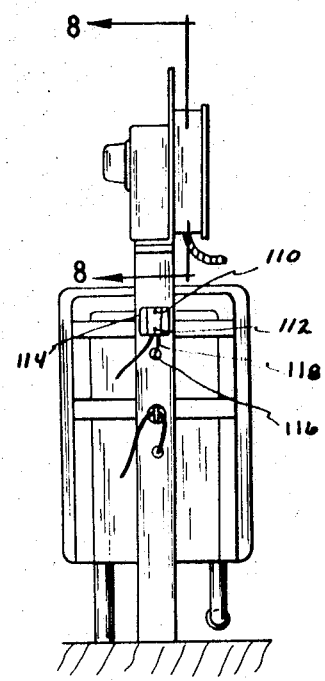
FIG. 6 is a left side elevation view of my invention.

As best shown in FIG. 6, the central portion 14 of the channel member 12 is provided with a pair of apertures adapted to receive self-threading screws or toggle bolts 110, 112 for supporting thereon a conventional telephone service box 114. An additional aperture 116 is provided in portion 14 immediately below box 114 to receive conventional telephone service wires 118 and permitting the wires to extend downwardly within the channel member 12 to opening 32 as shown in FIGS. 1 and 2, from which they emerge and extend underground to a convenient location for connection to the main telephone service line. The lead-in wires for conveying telephone service from the box 114 to mobile home 92 are contained in a conventional flexible, weatherproof cable 120 and are connected to the conventional telephone inlet (not shown) of mobile home 92 in the usual manner.

A conventional television antenna connection may be mounted upon central portion 14, preferably below telephone box 114, as shown in FIGS. 1 and 6. A television antenna cable 122 having one end connected to the mobile home 92 extends through a ring 124, which secures the cable to the portion 14, and through an aperture 126 formed in the portion 14. The cable 122 extends downwardly through the channel member 12 and out opening 32 to a common television antenna of a central antenna system providing service for several mobile homes.

Figure 5:
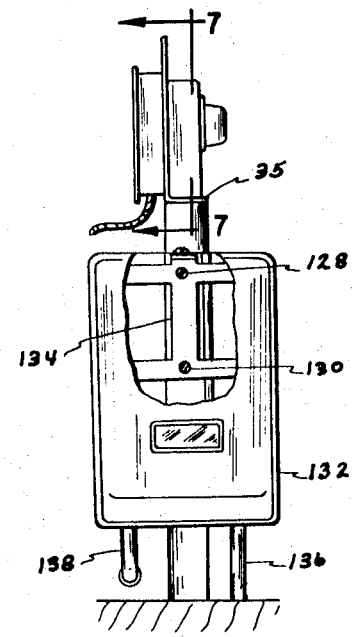
FIG. 5 is a right side elevation view of my invention.

A pair of apertures are provided in the right side of post 10 to receive self-threading screws or toggle bolts 128, 130 for securing a conventional gas meter box 132 to the post, as best shown in FIG. 5. Bracing means, generally indicated at 134 in FIG. 5, are conventionally provided within the gas meter box 132 to facilitate the mounting. A gas inlet pipe 136 extends from meter 132 downwardly into the ground, and from thence to the conventional distribution lines of the gas company, to supply gas under pressure to the meter. Metered gas is, in turn, conducted from meter 132 by a gas pipe 138 to the conventional gas inlet (not shown) of mobile home 92.

It will be particularly noted that the spatial arrangements of meter 38, power box 40 or 42, mounting bracket 34, apertures 80 and 106, ground wire 86, aperture 108, and channel member 12, all cooperate to provide a structurally strong, easily assembled, and perfectly grounded assembly for the purpose intended. Gasmeter 132 and telephone box 114 are physically separated and yet permanently grounded by common post 10 and channel member 12, respectively, to which they are fastened. The telephone box 114 and the television cable 122 are physically separated on the channel member 12.

The service lines and pipes for all four utilities extend underground from the post 10 and the channel member 12 to the conventional distribution lines or pipes of the utility companies, thus being protected against damage by moving vehicles and mobile homes being moved into and out of the trailer park. Lines 100, 120, 122, and 138, which conduct utility services from the mounting pedestal to mobile home 92 and ground wire 86, may be easily disconnected at their respective conventional points of connection to the mobile home when it is desired to remove the mobile home from the site.

It will be noted that although the mounting pedestal is shown and described for supplying utility services to a mobile home, it will be appreciated that the pedestal may readily be used to supply utility services to boats docked at a marina or even to provide temporary service to a house.

It is to be understood that the form of the invention herewith shown and described is to be taken as a preferred embodiment of the same and that resort may be had to various changes in construction without departing from the scope of the claims.

What is claimed is:

1. An elongated hollow post adapted to be partially embedded in the ground in an upright position, said post having an aperture formed therein which would be below ground when the post is embedded in the ground for receiving an electrical power supply cable;

a bracket supported at the top of said post and an electrical meter and an electrical power box mounted on said bracket;

a ground wire disposed adjacent the side of said post and having one end connected with said meter and said power box and an opposite end connected to a grounding means;

a cover secured to said post and enclosing a portion of said ground wire, a portion of said cover being below the ground when said post is embedded in the ground, said opposite end of said ground wire extending from said cover at a point along the length thereof which would be below the ground when the post is embedded in the ground.

2. The post as defined in claim 1, wherein said bracket includes an aperture formed in the portion of said bracket immediately adjacent the top of said post for receiving a wire therethrough.

3. The post as defined in claim 1, including a gasmeter mounted to said post.

4. The post as defined in claim 1, including a television jack mounted to said cover.

5. An elongated hollow post adapted to be secured in an upright position;

an electrical meter and electrical power box supported at the upper portion of said post; wires attached to said meter and said power box, said post including a pair of passageways formed therein substantially parallel to the axis of elongation of said post and enclosing said wires, said passageways being separated by a wall for at least a portion of their length and at least one of said wires being in each of said passageways.

6. The post as defined in claim 5, including a telephone box secured to said post.

7. An elongated hollow post adapted to be partially embedded in the ground in an upright position, said post having an aperture formed therein which would be below ground when the post is embedded in the ground for receiving an electrical power supply cable;

a bracket supported at the top of said post and adapted to support an electrical meter and an electrical power box thereon;

a ground wire disposed adjacent the side of said post and having one end adapted for connection with said meter and said power box and an opposite end adapted for connection to a grounding means;

a cover secured to said post and enclosing at least a portion of said ground wire, a portion of said cover being below the ground when said post is embedded in the ground, said opposite end of said ground wire extending from said cover at a point along the length thereof which would be below the ground when the post is embedded in the ground; and mounting means carried by said cover for securing a telephone box thereto.

8. An elongated hollow post adapted to be partially embedded in the ground in an upright position said post having an aperture formed therein which would be below ground when the post is embedded in the ground for receiving an electrical power supply cable;

a bracket supported at the top of said post and adapted to support an electrical meter and an electrical power box thereon;

a ground wire disposed adjacent the side of said post and having one end adapted for connection with said meter and said power box and an opposite end adapted for connection to a grounding means;

a cover secured to said post and enclosing at least a portion of said ground wire, a portion of said cover being below the ground when said post is embedded in the ground, said opposite end of said ground wire extending from said cover at a point along the length thereof which would be below the ground when the post is embedded in the ground; and means mounted on said post on the side opposite said cover for securing a gasmeter thereto and means carried by said cover for securing a telephone box thereto.

9. An elongated hollow post adapted to be partially embedded in the ground in an upright position, said post having an aperture formed therein which would be below ground when the post is embedded in the ground for receiving an electrical power supply cable;

a bracket supported at the top of said post and adapted to support an electrical meter and an electrical power box thereon;

a ground wire disposed adjacent the side of said post and having one end adapted for connection with said meter and said power box and an opposite end adapted for connection to a grounding means;

a cover secured to said post and enclosing a portion of said ground wire, a portion of said cover being below the ground when said post is embedded in the ground, said opposite end of said ground wire extending from said cover at a point along the length thereof which would be below the ground when the post is embedded in the ground;

means mounted on said post on the side opposite said cover for securing a gas meter thereto.

10. An elongated hollow post adapted to be partially embedded in the ground in an upright position, said post having an aperture formed therein which would be below ground when the post is embedded in the ground for receiving an electrical power supply cable;

a bracket supported at the top of said post and adapted to support an electrical meter and an electrical power box thereon;

a ground wire disposed adjacent the side of said post and having one end adapted for connection with said meter and said power box and an opposite end adapted for connection to a grounding means;

a cover secured to said post and enclosing at least a portion of said ground wire, a portion of said cover being below the ground when said post is embedded in the ground, said opposite end of said ground wire extending from said cover at a point along the length thereof which would be below the ground when the post is embedded in the ground;

said cover including an elongated U-shaped member having an elongated central portion and a pair of side portions extending outwardly from opposite longitudinal edges of said central portion in a substantially parallel relationship, the free longitudinal edges of said side portions being disposed immediately adjacent said post and forming a passageway between said post and said cover.

11. An elongated hollow post adapted to be partially embedded in the ground in an upright position, said post having an aperture formed therein which would be below ground when the post is embedded in the ground for receiving an electrical power supply cable;

a bracket supported at the top of said post and adapted to support an electrical meter and an electrical power box thereon;

a ground wire disposed adjacent the side of said post and having one end adapted for connection with said meter and said power box and an opposite end adapted for connection to a grounding means;

a cover secured to said post and enclosing at least a portion of said ground wire, a portion of said cover being below the ground when said post is embedded in the ground, said opposite end of said ground wire extending from said cover at a point along the length thereof which would be below the ground when the post is embedded in the ground; and a telephone box mounted on said cover, an aperture formed in said cover, and a telephone service wire having one end connected to said telephone box and extending through said aperture formed in said cover, the opposite end of said service wire adapted for connection to a main telephone service line and extending from said cover at a point which would be below the ground when the post is embedded in the ground.

12. The post as defined in claim 11, including a gasmeter secured to said post on the side opposite said cover.

13. An elongated hollow post adapted to be partially embedded in the ground in an upright position, said post having an aperture formed therein which would be below ground when the post is embedded in the ground for receiving an electrical power supply cable;
- a bracket supported at the top of said post and an electrical meter and an electrical power box supported on said bracket;
- a ground wire having one end connected adjacent said meter and said power box and an opposite end connected to a grounding means;
- a cover secured to said post and enclosing at least a portion of said ground wire, said cover extending beneath the ground when said post is embedded in the ground, said opposite end of said ground wire extending from said cover at a point along the length thereof which would be below the ground when the post is embedded in the ground; and
- a telephone box mounted to said cover.

14. An elongated hollow post adapted to be partially embedded in the ground in an upright position, said post having an aperture formed therein which would be below ground when the post is embedded in the ground for receiving an electrical power supply cable;
- a bracket supported at the top of said post and an electrical meter and an electrical power box supported on said bracket;
- a ground wire having one end connected adjacent said meter and said power box and an opposite end connected to a grounding means;
- a cover secured to said post and enclosing at least a portion of said ground wire, said cover extending beneath the ground when said post is embedded in the ground, said opposite end of said ground wire extending from said cover at a point along the length thereof which would be below the ground when the post is embedded in the ground; and
- a gasmeter mounted on said post on the side opposite said cover and a telephone box mounted to said cover.

15. An elongated hollow post adapted to be partially embedded in the ground in an upright position, said post having an aperture formed therein which would be below ground when the post is embedded in the ground for receiving an electrical power supply cable;
- a bracket supported at the top of said post and an electrical meter and an electrical power box supported on said bracket,
- a ground wire having one end connected adjacent said meter and said power box and an opposite end connected to a grounding means;
- a cover secured to said post and enclosing at least a portion of said ground wire, said cover extending beneath the ground when said post is embedded in the ground, said opposite end of said ground wire extending from said cover at a point along the length thereof which would be below the ground when the post is embedded in the ground; and
- a gasmeter mounted on said post on the side opposite said cover.

16. An elongated hollow post adapted to be partially embedded in the ground in an upright position, said post having an aperture formed therein which would be below ground when the post is embedded in the ground for receiving an electrical power supply cable;
- a bracket supported at the top of said post and an electrical meter and an electrical power box supported on said bracket;
- a ground wire having one end connected adjacent said meter and said power box and an opposite end connected to a grounding means;
- a cover secured to said post and enclosing at least a portion of said ground wire, said cover extending beneath the ground when said post is embedded in the ground, said opposite end of said ground wire extending from said cover at a point along the length thereof which would be below the ground when the post is embedded in the ground; and
- said cover including an elongated U-shaped member having an elongated central portion and a pair of side portions extending outwardly from opposite longitudinal edges of said central portion in a substantially parallel relationship, the free longitudinal edges of said side portions being disposed immediately adjacent said posts and forming a passageway between said post and said cover.

17. An elongated hollow post adapted to be partially embedded in the ground in an upright position said post having an aperture formed therein which would be below ground when the post is embedded in the ground for receiving an electrical power supply cable;
- a bracket supported at the top of said post and an electrical meter and an electrical power box supported on said bracket;
- a ground wire having one end connected adjacent said meter and said power box and an opposite end connected to a grounding means;
- a cover secured to said post and enclosing at least a portion of said ground wire, said cover extending beneath the ground when said post is embedded in the ground, said opposite end of said ground wire extending from said cover at a point along the length thereof which would be below the ground when the post is embedded in the ground; and
- a telephone box mounted on said cover, an aperture formed on said cover, and a telephone service wire having one end connected to said telephone box and extending through said aperture formed in said cover, the opposite end of said service wire adapted for connection to the main telephone service line and extending from said cover at a point which would be below the ground when the post is embedded in the ground.

18. An elongated hollow post adapted to be partially embedded in the ground in an upright position, said post having an aperture formed therein which would be below ground when the post is embedded in the ground for receiving an electrical power supply cable;
- an electrical meter and an electrical power box supported in back to back relationship at the top of said post;
- a ground wire having one end connected adjacent said meter and said power box and an opposite end connected to a grounding means;
- a cover secured to said post and enclosing at least a portion of said ground wire, said cover extending beneath the ground when said post is embedded in the ground, said opposite end of said ground wire extending from said cover at a point along the length thereof which would be below the ground when the post is embedded in the ground;
- a gasmeter mounted on said post on the side opposite said cover.

19. An elongated hollow post adapted to be partially embedded in the ground in an upright position;
- a bracket supported at the top of said post and an electrical meter and an electrical power supported on said bracket, an electrical power wire and a ground wire and said meter and said box having means thereon for securing said electrical power wire and said ground wire thereto;
- said post having an aperture formed therein which would be below the ground when the post is embedded in the ground for receiving one of said wires therethrough and a passageway formed therein substantially parallel to the axis of elongation of said post and communicating with said aperture for communicating the wire from said aperture to said meter and box, said post including a wall extending substantially parallel to the axis of elongation of said post for separating said power wire from said ground wire when said wires are connected to said meter and box; and said separating wall being formed by the outer wall of said post and including a cover secured to said post and enclosing a portion of at least one of said wires.

20. The post as defined in claim 19, including a gasmeter secured to said post.

21. The post as defined in claim 9, including mounting means carried by said post for securing a telephone box thereto.

22. The post as defined in claim 19, including means carried by said post for mounting a television jack thereto.